(No Model.)  M. G. HUBBARD, Jr.  3 Sheets—Sheet 2.
BRAKE FOR RAILROAD CARS.
No. 463,683. Patented Nov. 24, 1891.
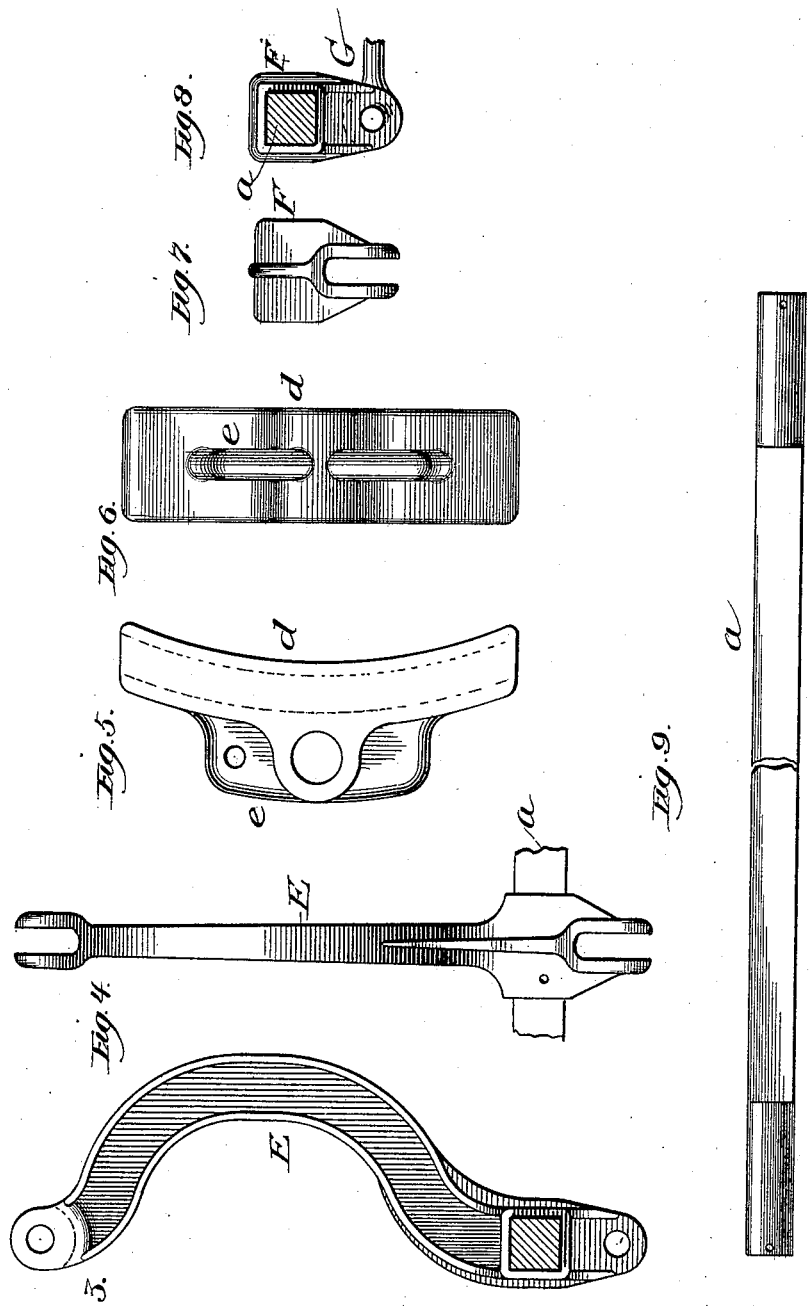

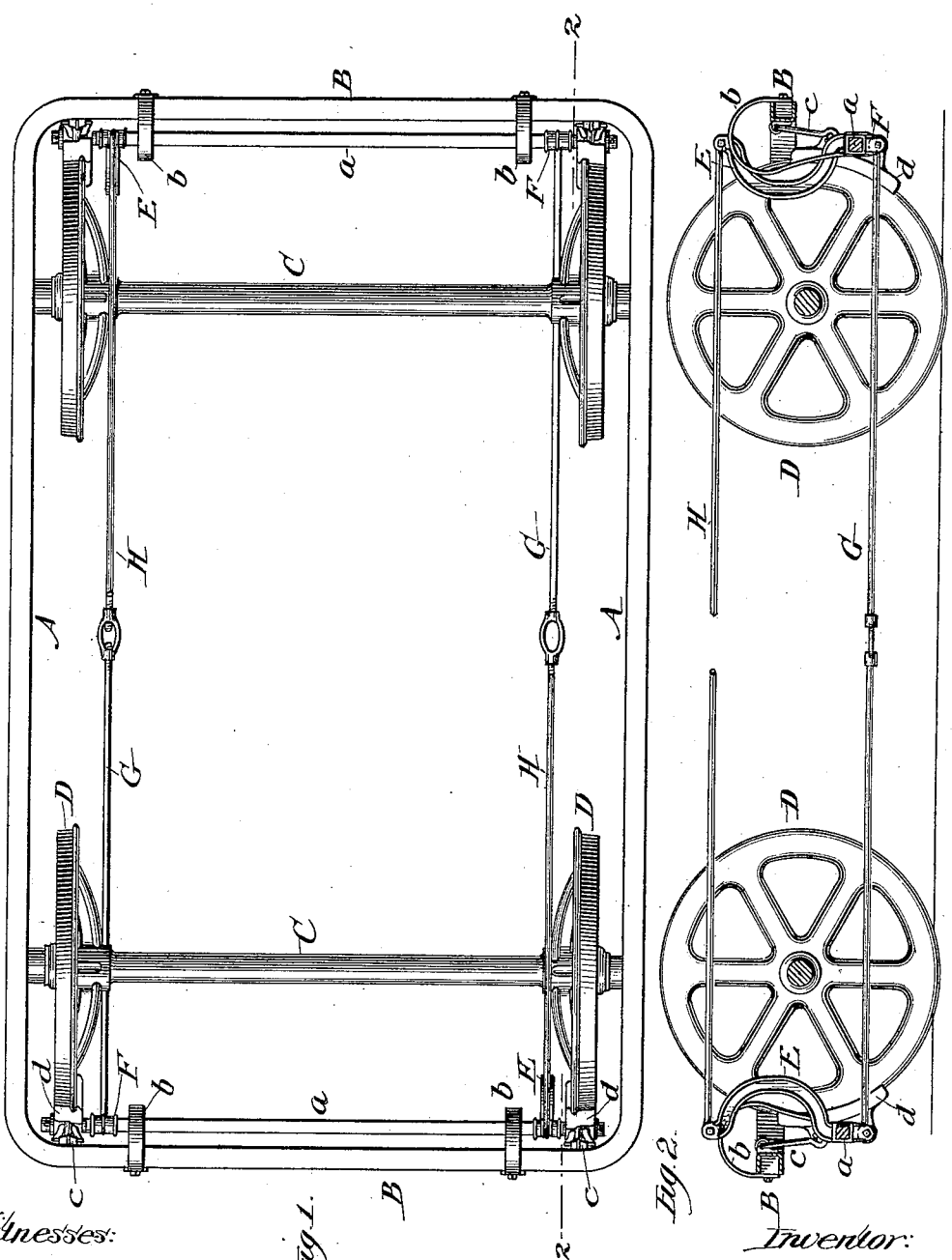

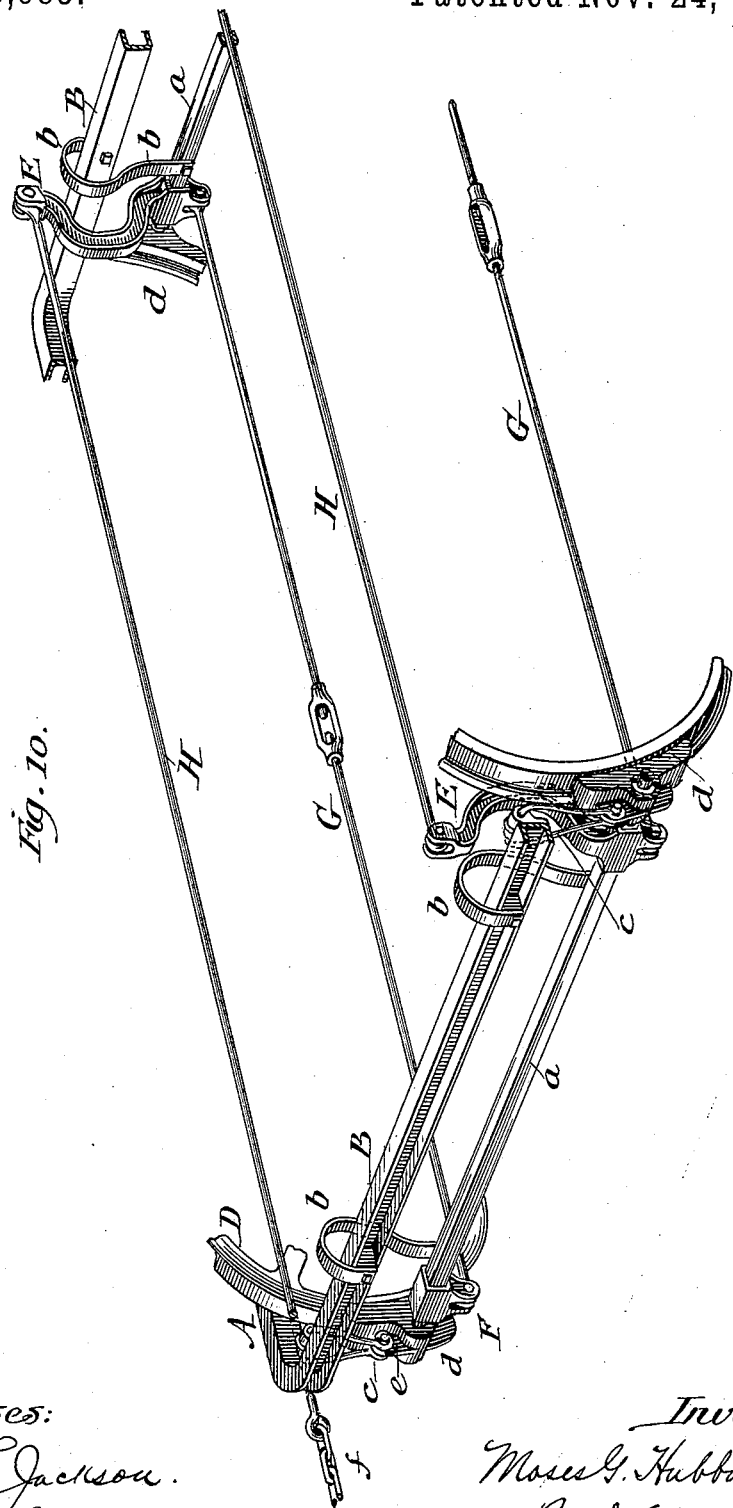

UNITED STATES PATENT OFFICE.

MOSES G. HUBBARD, JR., OF CHICAGO, ILLINOIS.

BRAKE FOR RAILROAD-CARS.

SPECIFICATION forming part of Letters Patent No. 463,683, dated November 24, 1891.

Application filed December 30, 1890. Serial No. 376,304. (No model.)

*To all whom it may concern:*

Be it known that I, MOSES G. HUBBARD, Jr., a citizen of the United States, residing in Chicago, county of Cook, and State of Illinois, have invented certain new and useful Improvements in Brakes for Railroad-Cars, of which the following is a specification, reference being had to the accompanying drawings.

My invention relates to an improved brake for railroad-cars.

It further relates to an improved arrangement of brake beams and levers and a novel brake-beam and its connection with the brake-shoes or shoe-backs.

It further consists of an improved arrangement of brake-shoes, brake-beams, brake-levers, and connecting-rods, and is applicable to all kinds of car-trucks, but is more particularly adapted for electric-motor and cable-grip trucks, all of which will be more fully described hereinafter.

In the accompanying drawings, which form part of this specification, Figure 1 is a plan view of my invention as arranged for electric-motor and cable-grip trucks. Fig. 2 is a side elevation of the same. Figs. 3 and 4 are detail views of the brake-levers. Figs. 5 and 6 are detail views of the brake-shoes and backs. Figs. 7 and 8 are detail views of the brake-cranks. Fig. 9 is a detail of the brake-beam, and Fig. 10 is a perspective view showing the method of operating the brakes.

The object of this invention is to construct and arrange a system of brakes which will bring the least practicable strain upon the center of the brake-beam with the greatest possible pressure on the brake-shoes, be simple and efficient, and leave the center of the truck clear for electric-motors or cable-grips, and have the brake connections so arranged that if one of the brake-rods becomes detached or is broken the aggregate brake pressure will remain unchanged, thus making a practically double connected brake and yet so constructed that it can be worked from either or both ends of the car. To accomplish this I form a round hole for a journal-bearing in the brake-shoe or shoe-back $d$, as shown in Figs. 5 and 6, in which the brake-beam $a$, Fig. 9, is journaled. This brake-beam $a$ is formed, preferably, of square iron, though other styles of bar may be used, and has journals formed at or near its ends which work in the bearings in the brake-shoes or shoe-backs $d$. A brake-lever E, Figs 3 and 4, having a socket formed therein to conform to the shape of the bar used for the brake-beam, is rigidly attached to said bar $a$ at or near one of its ends, and a crank-arm F, Figs. 7 and 8, having a similar socket formed therein, is rigidly attached at or near the opposite end of the bar $a$.

The brake-beams $a$ with the brake-shoes are hung to the truck, preferably, by links $c$, as shown in Figs. 1 and 2. When the brake beams and shoes are hung to the truck, the rods G, Figs. 1 and 2, are pivoted at one end to the lower end of the brake-lever E on one brake-beam and at the opposite end to the crank F on the other brake-beam. Rods H are pivoted to the top or long end of the lever E and run to the brake-mast or other actuating device at each end of the car, upon which they are wound by a chain connection $f$ in the usual manner; or, if desired, one of the rods H may be dispensed with and an equivalent used to tie one lever when it is only required to work the brakes from one end of the truck. If the proportions of the long and short ends of the lever E are, say, six to one and the crank F is the same length as the short end of E, with a pull of one hundred pounds on the rod H the rods G G will receive together a strain of six hundred pounds, and the brake-beam $a$ will be pressed toward the wheel with a force equal to the sum of the forces, or seven hundred pounds, giving a pressure of three hundred and fifty pounds on each shoe for each one hundred pounds of pull on the rod H. This pull is resisted on the opposite beam in the same manner, and therefore the pressure is the same on all the shoes, and with the leverage stated the pressure of each shoe against the wheel would be three hundred and fifty pounds for each one hundred pounds exerted on either of the rods H. The rods G G are provided with turn-buckles to take up the wear on the brake-shoes. It will also be seen that if one of the rods G were to become detached or broken the brakes would still work, only the greater part of the pressure would be on the shoes on the side of the truck where the rod G remained intact.

When the draw-rod H is located midway between the ends of the brake-beams, it is not difficult to substantially equalize the pressure of all of the shoes; but it has been found impracticable to so locate the rod for electric-motor trucks, as it interferes with the motor and prevents the formation of an open space in the middle of the truck or frame. By pivoting the brake-beam in the suspended shoes and firmly attaching the brake-lever E and crank arms or bars F and connecting the ends together by the tie-rods G, located below the axles at the sides and the draw-rods H at the sides, and crossing draw-rods over the truck I form a brake system around the center of the truck, which can be operated from either end of the truck with substantially equal pressure on all of the shoes and leave a clear central space.

The frame A B and the axle and wheels C D are best made as shown in my joint application with William A. McGuire of even date herewith; but they may be made in any suitable or well-known form and manner. The brake-beams $a$ are connected with return-springs $b$, so that the brake will release quicker and with more certainty than if the incline of the links $c$ were relied on solely, and when these springs are used it is not important that the supporting-links stand at an inclination when the shoes are drawn into braking contact with the wheels. The suspension-links $c$ are pivoted to the end bars B of the frame by suitable blocks or castings attached thereto and to the shoes by the strengthening-lugs $e$ or other suitable means, and by pivoting the brake-beams $a$ in these suspended shoes I am enabled to use a rocking brake-beam for setting the shoes against the wheels.

That which I claim as new, and desire to secure by Letters Patent, is—

1. In a car-brake, the combination, with the separately-suspended brake-shoes, of two or more axially-rocking brake-beams pivoted in the brake-shoes or shoe-backs and means for rocking the brake-beams, substantially as described.

2. The axially-rocking brake-beams journaled in the suspended brake-shoes or brake-shoe backs and arranged to apply all the shoes with substantially equal pressure, in combination with the brake-shoes and wheels, substantially as and for the purposes described.

3. Two or more axially-rocking brake-beams journaled in the brake-shoes or shoe-backs and arranged to be all rocked on said journals to apply the brakes, in combination with the car-wheels, brake-shoes, brake connections, and levers, substantially as and for the purposes set forth.

4. In a car-brake, two or more brake-beams arranged to be rocked upon their centers, in combination with the directly-suspended brake-shoes, brake connections, and levers, substantially as described.

5. Two or more axially-rocking brake-beams to each truck journaled in suspended brake-shoes or shoe-backs and arranged to force the shoes against the wheels with practically equal pressure by being rocked on the centers of said journals, for the purpose substantially as set forth.

6. The combination of the brake-beams journaled in the brake-shoes or shoe-backs, the brake-levers attached to said beams at or near one end and projecting on two sides thereof, the crank-arms attached at or near the opposite ends of said beams, the connecting-rods, and brake-shoes, whereby the brake-beams are made to act as the fulcrums of the brake-levers and a maximum and practically equal pressure on the shoes obtained with a minimum strain on the connecting-rods, substantially as specified.

7. In a car-brake, the combination of the axially-rocking brake-beams provided at or near their ends with levers and journaled in the brake-shoes or shoe-backs with connecting-rods located on each side of the truck and connected with the levers for axially rocking the brake-beams, whereby the brake is prevented from losing its effectiveness in case either one of the connecting-rods becomes detached or broken, substantially as described.

8. A car or truck brake having axially-rocking brake-beams provided with two or more lower connections for forcing all the brake-shoes against the wheels with practically equal pressure, substantially as described, whereby either one of the lower connections can be broken or detached without decreasing the aggregate brake-pressure on the wheels, substantially as described.

9. The combination of the rocking brake-beams $a$, levers E, crank-arms F, and tie-rods G with the suspended shoes $d$ and draw-rods H, substantially as described.

10. A brake-operating mechanism composed of one or more rock-shafts provided with actuating-levers, said rock-shafts having cylindrical end journals turning in bearings in separately-suspended brake-shoes or shoe-backs and intermediate the end journals having any desired angular or oval section except round, and said actuating-levers each having a socket formed therein to fit the section of the rocking shaft between the cylindrical end journals, whereby the said levers can be located at any desired point on said rock-shaft without the aid of keys or set-screws, substantially as described.

MOSES G. HUBBARD, JR.

Witnesses:
JOHN L. JACKSON,
ALBERT T. J. ANDERSON.